(12) United States Patent
Irwin

(10) Patent No.: US 7,716,873 B2
(45) Date of Patent: May 18, 2010

(54) MULTILAYER VEGETATION SUPPORT SYSTEM

(75) Inventor: George Irwin, Rochester, NY (US)

(73) Assignee: Green Living Technologies, LLC, Rochester, NY (US)

( * ) Notice: Subject to any disclaimer, the term of this patent is extended or adjusted under 35 U.S.C. 154(b) by 0 days.

(21) Appl. No.: 12/211,536

(22) Filed: Sep. 16, 2008

(65) Prior Publication Data

US 2010/0064580 A1    Mar. 18, 2010

(51) Int. Cl.
*A01G 9/02* (2006.01)
(52) U.S. Cl. .......................................... 47/65.9; 47/66.1
(58) Field of Classification Search ................... 47/65.5, 47/65.7, 65.9, 66.1, 66.5, 66.6, 73, 74, 75, 47/66.7, 78, 77, 86, 87, 56, 58.1 R
See application file for complete search history.

(56) References Cited

U.S. PATENT DOCUMENTS

| 2,113,523 | A | | 4/1938 | White |
| 4,118,892 | A | * | 10/1978 | Nakamura et al. ........... 47/65.9 |
| 4,645,635 | A | | 2/1987 | Yuen et al. |
| 4,853,101 | A | | 8/1989 | Hruska et al. |
| 4,961,284 | A | | 10/1990 | Williams |
| 5,287,650 | A | | 2/1994 | Moriguchi et al. |
| 5,410,840 | A | | 5/1995 | Loesken |
| 5,647,695 | A | | 7/1997 | Hilfiker et al. |
| 6,178,690 | B1 | | 1/2001 | Yoshida et al. |
| 6,237,285 | B1 | | 5/2001 | Yoshida et al. |
| 6,606,823 | B1 | * | 8/2003 | McDonough et al. ........ 47/65.9 |
| 6,725,601 | B2 | | 4/2004 | Chick |
| 6,862,842 | B2 | * | 3/2005 | Mischo ....................... 47/65.9 |
| 7,204,057 | B2 | * | 4/2007 | Behrens ...................... 47/65.9 |
| 2002/0007593 | A1 | * | 1/2002 | Mischo .......................... 47/86 |
| 2005/0229535 | A1 | | 10/2005 | Garner et al. |
| 2007/0094927 | A1 | | 5/2007 | Perry |
| 2007/0283653 | A1 | | 12/2007 | Garner et al. |
| 2008/0236041 | A1 | * | 10/2008 | Carpenter ................... 47/65.9 |
| 2009/0223126 | A1 | | 9/2009 | Garner et al. |
| 2009/0249690 | A1 | | 10/2009 | Garner, II |

* cited by examiner

*Primary Examiner*—T. Nguyen
(74) *Attorney, Agent, or Firm*—Brian B. Shaw, Esq.; Stephen B. Salai, Esq.; Harter Secrest & Emery LLP

(57) ABSTRACT

A multilayer vegetation support system is provided, wherein the system includes a reservoir substrate and an overlying composite, wherein a growing medium and vegetation are disposed on an exposed surface of the composite. The reservoir substrate is a generally planar member having a plurality of recesses or dimples, and can include a plurality of drain apertures in land areas intermediate the dimples. The composite includes a water retention layer, a root barrier layer and a multitude of projecting loops, wherein a growing medium and vegetation overlie and intertwine with the projecting loops.

6 Claims, 3 Drawing Sheets

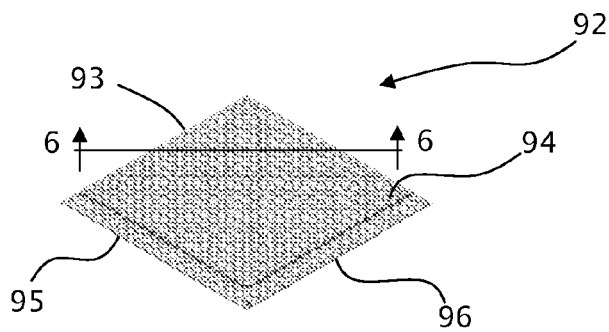
FIGURE 3
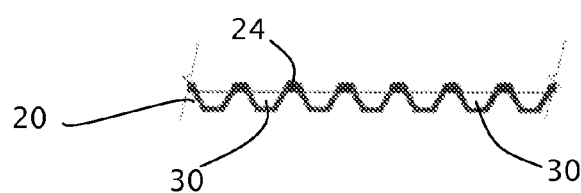
FIGURE 4
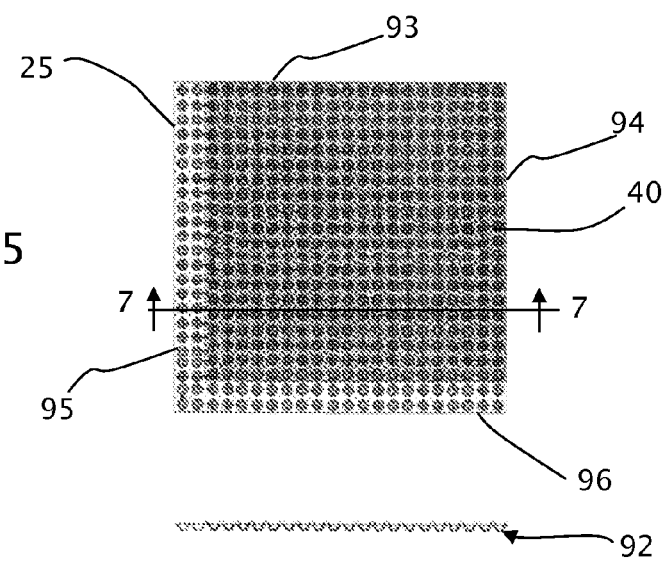
FIGURE 5
FIGURE 6
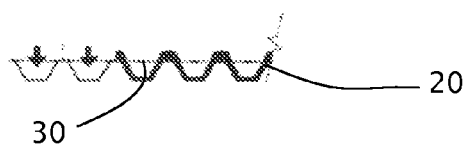
FIGURE 7

FIGURE 8
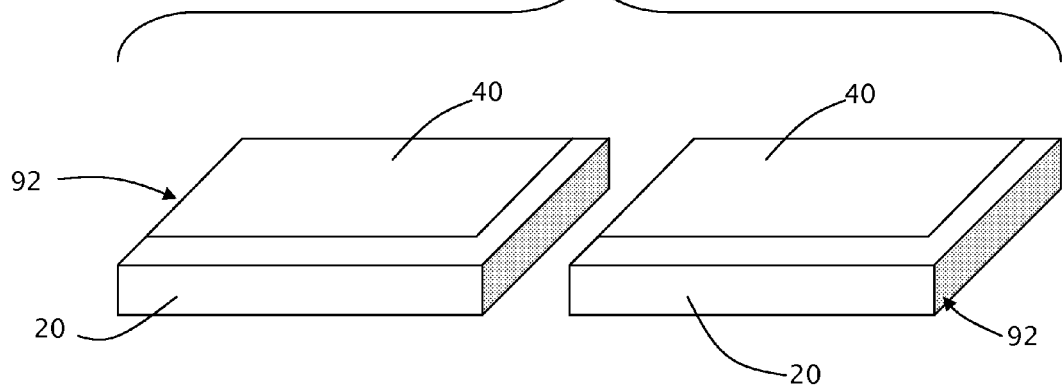
FIGURE 9
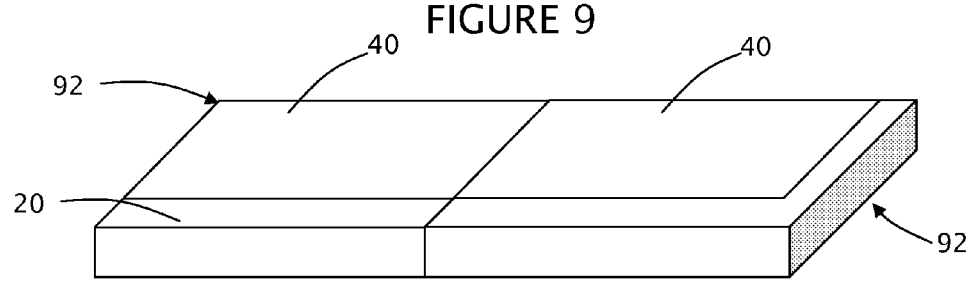
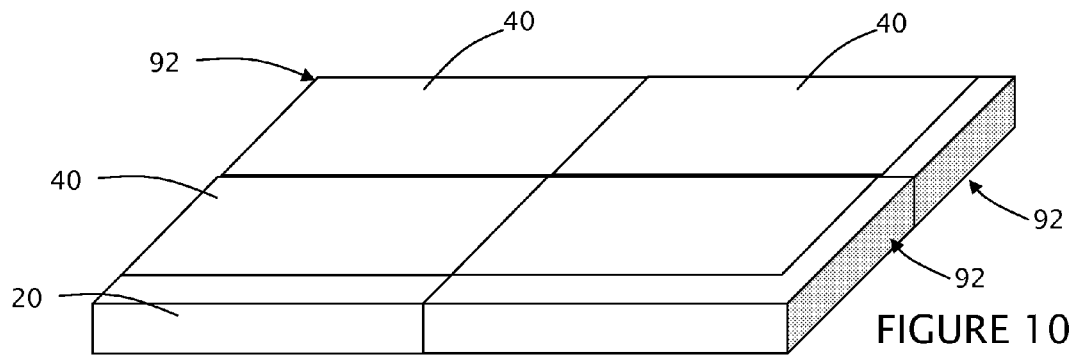
FIGURE 10

MULTILAYER VEGETATION SUPPORT SYSTEM

CROSS-REFERENCE TO RELATED APPLICATIONS

Not applicable.

STATEMENT REGARDING FEDERALLY SPONSORED RESEARCH OR DEVELOPMENT

Not applicable.

LIMITED PARTIES TO A JOINT RESEARCH AGREEMENT

Not applicable.

REFERENCE TO A "SEQUENCE LISTING"

Not applicable.

BACKGROUND OF THE INVENTION

1. Field of the Invention

The present invention relates to a system for supporting live plant growth on building roofs and particularly to a self-contained modular system for retaining the plant growth independent of the underlying roof structure.

2. Description of Related Art

A green roof is a roof that is at least partially and usually substantially covered with vegetation. Green roofs can improve energy efficiency of buildings, reduce storm water run-offs and contribute to a healthier environment. Green roofs can also provide a mechanism to offset rising energy costs and address the constant demand for increased energy efficiency.

For example, urban heat island effect is used to describe urban air and surface temperatures that are higher than nearby rural areas. Typically, the urban surfaces such as pavement and rooftops tend to absorb solar energy and reradiate the energy as heat. This, in turn, raises temperatures which can negatively impact the environment by raising energy costs and creating adverse health conditions.

Green roofs are an effective counter-measure to offset at least a portion of the urban heat island effect. A green roof provides shade to the underlying roof and reduces temperature by cooling the air that surrounds the plants of the green roof. That is, the evapotranspiration experienced by the plants tends to reduce local temperatures, thereby reducing thermal loads on the buildings. In addition, the vegetation of a green roof can absorb rainfall and thus reduce storm water runoff that would otherwise collect pollutants and be drained into water supplies necessitating further treatment of the water runoff.

However, the need remains for a system for providing rooftop vegetation which can be maintained in an economical manner, without requiring retrofitting the structural design of the underlying building, or exposing the existing structure to detrimental effects of the vegetation.

BRIEF SUMMARY OF THE INVENTION

A system for providing rooftop vegetation is disclosed, wherein the system can be maintained in an economical manner, without requiring retrofitting the structural design of the underlying building, or exposing the existing structure to detrimental effects of the vegetation.

In one configuration, the system includes a reservoir substrate having a plurality of dimples separated by land areas, a plurality of the land areas including a drain hole; and a composite on the reservoir structure overlaying the plurality of dimples, wherein the composite has a barrier layer substantially precluding the passage of roots, a water retention layer, and a root stabilizing matrix extending from the wick layer, the root stabilizing matrix having a multitude of projecting loops, wherein a plurality of the loops are interconnected at a position spaced from the water retention layer.

The present system also provides a method of supporting vegetation in a multilayer vegetation support system on a roof, by disposing a reservoir substrate on the roof, the reservoir substrate including a plurality of concave dimples separated by land areas, the land areas including a drain hole; and disposing a composite on the reservoir substrate to overlay the plurality of dimples and form a corresponding number of chambers defined by the reservoir structure and the composite, the composite having a root barrier layer and a multitude of projecting loops, the loops being interconnected at a multitude of locations spaced from the root barrier layer.

BRIEF DESCRIPTION OF THE SEVERAL VIEWS OF THE DRAWING(S)

FIG. 3 is a perspective view of a composite layer and the reservoir layer.

FIG. 4 is a cross sectional view taken along lines 4-4 of FIG. 3.

FIG. 5 is a top plan view of the assembly of FIG. 3.

FIG. 6 is a cross sectional view taken along lines 6-6 of FIG. 5.

FIG. 7 is an enlarged portion of the cross sectional view of a portion of FIG. 6.

FIG. 8 is a perspective view of a pair of separate panels.

FIG. 9 is a perspective view of the panels of FIG. 8 in an interlocked configuration.

FIG. 10 is a perspective view of four panels in an interlocked configuration.

DETAILED DESCRIPTION OF THE PREFERRED EMBODIMENTS

Figure 1:
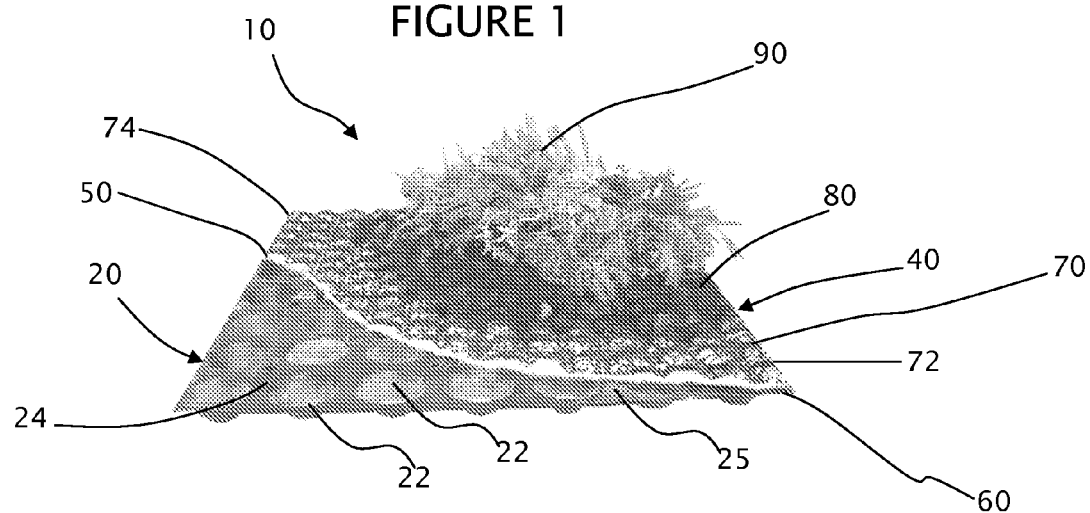
FIG. 1 is a perspective view of a partial cutaway view of an assembled system showing the composite layer with an associated growing medium and vegetation.
Figure 2:
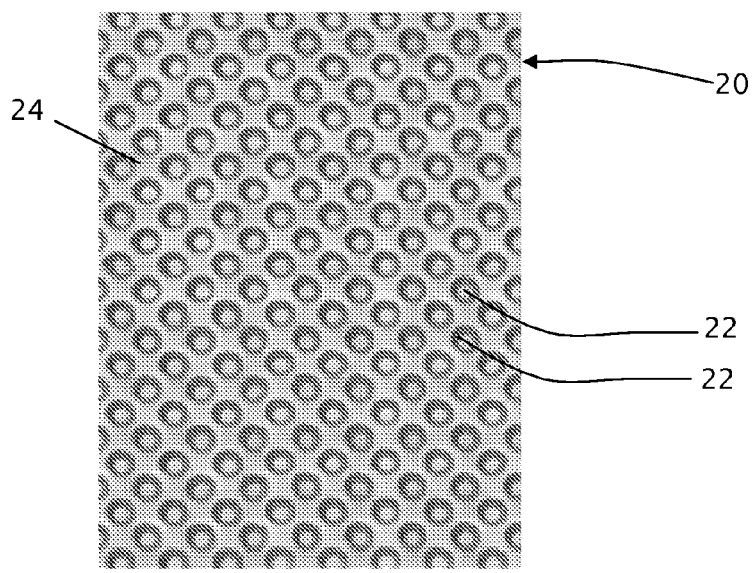
FIG. 2 is a top plan view of a reservoir layer.

Referring to FIG. 1, a multilayer vegetation support system 10 is disclosed having a reservoir substrate 20 and an overlying composite 40, wherein a growing medium 80 and vegetation 90 can be provided on an exposed surface of the composite.

Referring to FIGS. 1-7, the reservoir substrate 20 is a generally planar member having a plurality of recesses or dimples 22. In one configuration, the reservoir substrate 20 is a generally dimpled surface. The dimples 22 have a depth of approximately ⅛ inch to an inch, with an advantageous range of approximately ¼ inch to ¾ inch and a satisfactory depth of approximately 5/16 of an inch.

The dimples 22 are generally separated by land areas 24 lying in a common plane. As seen in FIG. 5, a plurality of the land areas 24 include drain holes 25 or apertures for providing water movement from a top side of the reservoir substrate 20 to a bottom side of the reservoir substrate.

The density of the dimples 22 (number of dimples per square inch) can range from approximately 0.25 to 4, with a working range of approximately 0.8 to 1.5, wherein a satisfactory density of dimples is approximately 1.2 per square inch. Further, the dimples 22 can be of generally a uniform size, however, it is contemplated the cross-sectional volume of a given dimple can be varied within the reservoir substrate 20.

The dimples 22 can be regularly spaced or irregularly spaced about the reservoir substrate 20. It is also contemplated the cross sectional profile of the dimples 22 can be uniform throughout the reservoir substrate 20. However, different portions of the reservoir substrate 20 can have different cross sectional profiles, depending upon the intended operating parameters, or anticipated types of vegetation.

The reservoir substrate 20 is at least substantially impervious to root penetration. A high density polyethylene (HDPE) material has been found a satisfactory material for the reservoir substrate 20. A satisfactory thickness of the material forming the reservoir substrate 20 has been found to be approximately 0.6 mm, with a substrate density of approximately 580 g/m$^2$.

A satisfactory reservoir substrate 20 is such as sold as a dimpled membrane by Superseal Construction Products Ltd. and Superseal Basement Systems Ltd. of Surrey, British Columbia, Canada.

The composite 40 includes a water retention layer 50, a root barrier layer 60 and a multitude of projecting loops 70.

The water retention layer 50 retains provided water, while also providing a capillary transport of water within and through the layer, such as from an exposed water source beneath the layer. The water retention layer 50 can include a plurality of nonwoven layers which are sewn or bonded together. The water retention layer 50 incorporates sufficiently proximal fibers that water contacting the layer experiences a capillary effect to retain the water within the layer. Thus, water exposed to an underside of the water retention layer 50 is wicked upward into the layer.

The root barrier layer 60 can be formed a single or a plurality of sheets, which are sufficiently bound to substantially preclude root penetration through the root barrier. In one configuration, the root barrier layer 60 is pervious to water, thereby allowing the passage or migration of water through the root barrier layer. The root barrier layer 60 can be advantageously located beneath the water retention layer 50. It is contemplated the root barrier layer 60 can be located intermediate an upper water retention layer and a lower water retention layer.

The multitude of projecting loops 70 extending from the water retention layer 50 provide a root stabilization blanket. Portions of the loops 70 can be bonded to the water retention layer 50 or the root barrier layer 60 such that the loops pass through the water retention layer. In addition, portions of the loops 70 projecting above the water retention layer and spaced from the water retention layer are also bonded together, thereby rendering the root stabilization blanket self supporting. The loops 70 are constructed to provide a matrix into which the vegetation roots can grow and intertwine, thereby anchoring the vegetation to the composite 40. In one configuration, the loops 70 extend from one side of the water retention layer 50 at a variety of loop heights to define a loop layer 72. In this configuration, the loop layer 72 is substantially open, wherein the layer incorporates interstitial spaces defined by the loops 70 of at least approximately 50%, and as much as 60% to 70%, with satisfactory results being obtained with a 85-90 to 95% interstitial space within the loop layer 72. In an alternative configuration, the loops 70 can be of a substantially uniform height.

In one configuration, the composite 40 has a thickness between approximately 0.25 inches and 1 inch with a satisfactory thickness of approximately 0.4 inches, wherein the water retention layer 50 has a thickness from approximately 0.1 to 0.5 inches and the loops 70 have a height of approximately 0.2 to 0.9 inches. Alternatively, the loops 70 can define from approximately 50% to 98% of the thickness of the composite 50. The loops 70 are configured to provide entangling or entwining of the vegetation root system, such that the loops and the roots essentially interlock.

A satisfactory structure for the composite 40 is sold under the mark ENKAMAT® of Enka BV, Netherlands sold by Colbond of North Carolina. In this configuration, the projecting loops 70 are formed with nylon filaments which are generally fused at intersections 74 spaced from the non-woven water retention layer.

A growing medium 80, or soil composition, is disposed on the composite 40 to at least substantially embed the projecting loops 70. The growing medium 80 can comprise any nutrient laden medium that provides nutrients to the plants and can include combinations of soils, rocks, or other lightweight material into which the roots can grow to provide a stable base for the vegetation. Moreover, liquid nutrients can be sprayed onto the growing medium 80 or otherwise deposited such that the plants receive essential nutrients as necessary. The growing medium 80 typically comprises a mixture of soil and rock complying with ASTM-D422. The specific composition of the growing medium 80 is at least partially determined by the intended vegetation to be grown and the environmental conditions to which the vegetation support system will be subjected.

The vegetation or plant growth 90 is cultivated in the growing medium 80. A root system of the vegetation 90 intertwines with the projecting loops thereby effectively locking the vegetation and the soil to the composite 40.

The vegetation 90 can be any of a variety of plants compatible with the intended environment of the vegetation support system 10. In the northern hemisphere, sedum has been found as a satisfactory plant for cultivation in the growing medium 80.

Construction of the vegetation support assembly 10 includes disposing the composite 40 onto the reservoir substrate 20. In one configuration, the composite 40 is attached to the reservoir substrate 20 to form a number of chambers 30 corresponding to the dimples 22 in the reservoir substrate 20. The composite 40 may be retained relative to the reservoir structure 20 by any of a variety of connecting means such as friction, detents, clamps, adhesives, or mechanical fasteners. Thus, the reservoir substrate 20 and composite 40 form a panel 92.

For the panel 92, the composite 40 can be sized to overlie substantially the entire area of the reservoir substrate 20. Alternatively, the composite 40 can be sized to remain within the periphery of the reservoir substrate 20. That is, a border of exposed reservoir substrate 20 can surround a portion of the composite 40. Referring to FIGS. 3 and 5-7, in a further configuration, the composite 40 can be coterminous with the periphery of the reservoir substrate 20 along two adjacent edges 93, 94 of the panel 92 and recessed from the remaining two edges 95, 96. This partial offset allows for interlocking adjacent panels 92 by nesting the dimples 22 of one panel with the dimples of the second panel, wherein an edge of the composites 40 of the nested panels abut, thereby providing a substantially continuous composite.

Typical dimensions for the panels 92 is from approximately 24 inches to 60 inches, where a square panel dimension of approximately 43 inches, having an overlap periphery of approximately 4 inches, thereby defining an approximately 39 inch square area of vegetation.

As seen in FIGS. 4, 6 and 7, the spacing and sizing of the dimples 22 in conjunction with the self supporting construction of the composite 40 with respect to the scale of the dimples) provides that the composite does not sag or depress into the dimples of the reservoir structure 20. Thus, at least a substantial portion of the entire volume of the dimple defines the chamber 30 and remains available for retaining water. That is, the dimples 22 of the reservoir substrate 20 in the vegetation support assembly 10 are not occluded by the composite 40 and remain substantially unobstructed. Typically, at least 30% of the volume of the dimple 22 is unobstructed and in selected configurations at least 50% to 75% or more of the dimple remains unobstructed.

Typically, the reservoir substrate 20 and corresponding composite 40 are sized to facilitate not only installation of the system 10, but also selective movement of given panels 92 to access the underlying building. The vegetation support system 10 can be deployed as a plurality of panels 92 that are disposed on the underlying roof structure.

Typically, the growing medium 80 is disposed upon the panels 92 of the composite 40 and reservoir structure 20. Seeds or plants are disposed within the growing medium 80 and watered to facilitate vegetation growth and hence root growth into the projecting loops 70 of the composite 40. As the plants mature, the root systems intertwine with the projecting loops 70 thereby effectively locking the plants on the soil relative to the composite 40.

It is contemplated the vegetation 90 can be grown in place. Alternatively, the panels 92 can be assembled and the vegetation rooted, prior to installation on the roof of a building.

In use, environmental rain adds moisture to the growing medium 80. At least a portion of excess water, that is not retained by the growing medium 80, is captured and retained by capillary action in the water retention layer 50. Further excess water is allowed to seep into the dimples 22 of the reservoir structure 20 thereby capturing the water within the system 10. If additional excess water is introduced to the system 10, the drain holes 25 in the land areas 24 of the reservoir substrate 20 allow passage of the water from the system 10 to the underlying existing building roof.

As the plant roots are limited to the growing medium 80 and the projecting loops 70, the roots do not pass through the water retention layer 50. That is, as the roots are spaced from the dimples 22 (which can retain standing water) the roots are precluded from being immersed in water. Therefore, any residual water retained within the underlying reservoir structure 20 is not continuously surrounding the roots, thereby reducing the occurrence of root-rot.

While a preferred embodiment has been shown and described for particularity, it will be appreciated that various changes and modifications may suggest themselves to one having an ordinary skill in the art upon being appraised of the present invention. It is intended to encompass all such changes and modifications as fall within the scope of the pending claims.

ITEM LIST

| | |
|---|---|
| 10 | system |
| 20 | reservoir substrate |
| 22 | pockets/dimples |
| 24 | land area |
| 25 | drain hole |
| 30 | chamber |
| 40 | composite |
| 50 | water retention layer |
| 60 | root barrier layer |
| 70 | projecting loops |
| 72 | loop layer |
| 74 | fused intersections |
| 80 | growing medium |
| 90 | vegetation |
| 92 | panel |
| 93 | adjacent edge |
| 94 | adjacent edge |
| 95 | adjacent edges |
| 96 | adjacent edges |

The invention claimed is:

1. A multilayer vegetation support system assembly comprising:
 a first panel including a first reservoir substrate having a first reservoir substrate periphery extending about a plurality of first dimples separated by first land areas and an overlying first composite, the first composite having (i) a first barrier layer, (ii) a first water retention layer, and (iii) a first root stabilizing matrix, a portion of a periphery of the first composite being offset from a portion of the first reservoir substrate periphery to expose a number of the first dimples; and
 a second panel including a second reservoir substrate having a second reservoir substrate periphery extending about a plurality of second dimples separated by second land areas and an overlying second composite, the second composite having (i) a second barrier layer, (ii) a second water retention layer, and (iii) a second root stabilizing matrix,
 a number of the second dimples nested within the exposed first dimples.

2. The multilayer vegetation support system assembly of claim 1, wherein a portion of the periphery of the first composite abuts a portion of the periphery of the second composite.

3. The multilayer vegetation support system assembly of claim 1, wherein a portion of the periphery of the first composite abuts a portion of the periphery of the second composite to form a substantially continuous surface.

4. The multilayer vegetation support system assembly of claim 1, wherein a portion of a periphery of the second composite is offset from a portion of the second reservoir substrate periphery to expose a number of the second dimples.

5. The multilayer vegetation support system assembly of claim 1, wherein a periphery of the first composite is coterminous with the first reservoir substrate periphery along a first and a second edge of the first panel, and the periphery of the first composite is offset from the first reservoir substrate periphery along a third and a fourth edge of the first panel.

6. The multilayer vegetation support system assembly of claim 1, wherein a periphery of the first composite is within the first reservoir substrate periphery to form an exposed border of the first reservoir substrate surrounding the composite.

* * * * *